United States Patent [19]
Lucht

[11] Patent Number: 4,732,229
[45] Date of Patent: Mar. 22, 1988

[54] MEANS FOR HEATING AND COOLING A TRUCK CAB

[76] Inventor: James P. Lucht, 834 Hidden Hills Dr., Bellevue, Nebr. 68005

[21] Appl. No.: 15,085

[22] Filed: Feb. 17, 1987

[51] Int. Cl.$^4$ ............................................. B60H 1/32
[52] U.S. Cl. .................. 180/69.6; 180/89.1; 62/244; 62/323.1
[58] Field of Search ............... 180/69.6, 89.1; 62/127, 62/323, 239, 244, 196.4

[56] References Cited

U.S. PATENT DOCUMENTS

| | | | |
|---|---|---|---|
| 2,799,143 | 7/1957 | Weigel | 62/196.4 |
| 3,057,171 | 10/1962 | Hulse | 62/239 |
| 3,211,076 | 10/1965 | Chancellor | 98/2.11 |
| 3,855,814 | 12/1974 | Eubank | 62/244 |
| 3,885,398 | 5/1975 | Dawkins | 62/244 |
| 4,144,719 | 3/1979 | Williams | 62/239 |
| 4,217,764 | 8/1980 | Armbruster | 62/323 |
| 4,271,677 | 6/1981 | Harr | 62/127 |
| 4,637,220 | 1/1987 | Sakano | 62/244 |
| 4,658,599 | 4/1987 | Kajiwara | 62/244 |

*Primary Examiner*—Richard A. Bertsch
*Attorney, Agent, or Firm*—Zarley, McKee, Thomte, Voorhees & Sease

[57] ABSTRACT

An apparatus is described for heating and cooling a truck cab through the utilization of an auxiliary water cooled engine mounted on the truck. The auxiliary engine has an airconditioner compressor mounted thereon which supplies refrigerant to a condensor which is operatively connected to the air-conditioner evaporator on the primary engine of the truck so that the interior of the truck cab may be cooled without running the primary truck engine. The hot coolant water in the auxiliary engine is fluidly connected to the heater core of the truck heating system so that the interior of the cab may be heated without operating the primary truck engine. An alternator is mounted on the auxiliary engine and is electrically connected to the truck electrical system.

6 Claims, 7 Drawing Figures

MEANS FOR HEATING AND COOLING A TRUCK CAB

BACKGROUND OF THE INVENTION

The large diesel-powered trucks being used today for transporting cargo or the like normally include a sleeper cab which is heated or cooled by the heater or air-conditioning equipment on the truck. When the driver stops to sleep, he normally lets the truck engine idle so that the cab will either be cooled or heated depending upon the weather conditions.

Even though the truck may not have sleeping facilities therein, the driver will sometimes let the truck engine run at idle speed for long periods of time rather than attempting to start the truck when the truck has been subjected to cold temperatures for a period of time. Further, the fuel tanks, battery, etc. are sometimes heated by the truck electrical system and the operation of the same, without running the truck engine, will discharge the battery. Thus, the driver lets the engine idle to prevent the battery from discharging.

Excessive engine idling is a problem confronted by substantially all of the fleet operators throughout the United States. Not only is fuel consumed during the period of idle but the engine is subjected to excessive wear.

Therefore, it is a principal object of the invention to provide an improved means for heating and cooling a truck cab.

A further object of the invention is to provide a means for heating and cooling a truck cab through the utilization of an auxiliary engine.

Still another object of the invention is to provide a means for heating and cooling a truck cab wherein an auxiliary engine is employed which drives an air-conditioner compressor which is connected to the evaporator of the existing truck air-conditioner.

Still another object of the invention is to provide a means for heating a truck cab through the utilization of an auxiliary engine wherein the hot coolant in the auxiliary engine is fluidly supplied to the truck heater so that the cab may be heated without operating the truck engine.

Still another object of the invention is to provide a means for heating and cooling a truck cab by way of an auxiliary engine which also includes an alternator to enable electrical components on the truck to be operated without discharging the truck battery.

Still another object of the invention is to provide a means for heating and cooling a truck cab by means of an auxiliary engine which prevents excessive wear on the truck engine and which reduces fuel consumption.

Yet another object of the invention is to provide a means for heating and cooling a truck cab including an auxiliary engine which is economical, durable in use and refined in appearance.

These and other objects will be apparent to those skilled in the art.

SUMMARY OF THE INVENTION

A means for heating and cooling a truck cab is disclosed including an auxiliary engine which is mounted on the truck frame at the rear of the truck cab. The auxiliary engine is water cooled and has its coolant fluidly connected to the heater core of the truck heater so that hot water can be supplied to the truck heater to heat the cab of the truck without the necessity of operating the truck engine. The auxiliary engine also powers an air-conditioner compressor which is fluidly connected to a condensor mounted on the auxiliary engine and which is operatively connected to the air-conditioner evaporator coil on the truck so that the interior of the cab may be cooled without operating the truck engine.

DESCRIPTION OF THE PREFERRED EMBODIMENT

Figure 1:
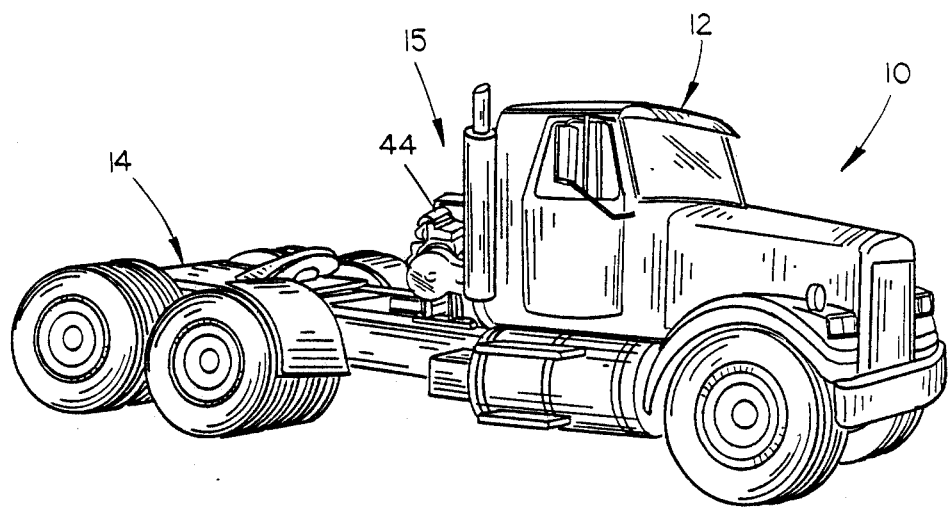
FIG. 1 is a perspective view of a truck having the apparatus of this invention mounted thereon.
Figure 2:
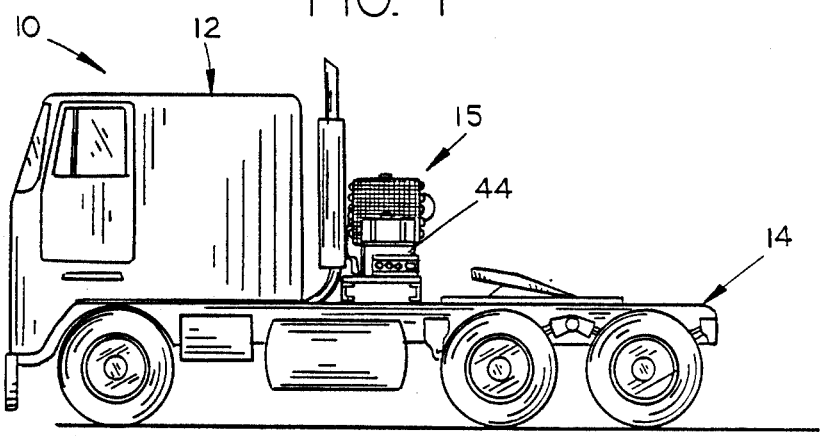
FIG. 2 is a side view of a truck similar to that illustrated in FIG. 1 except that the truck includes a sleeper cab.
Figure 3:
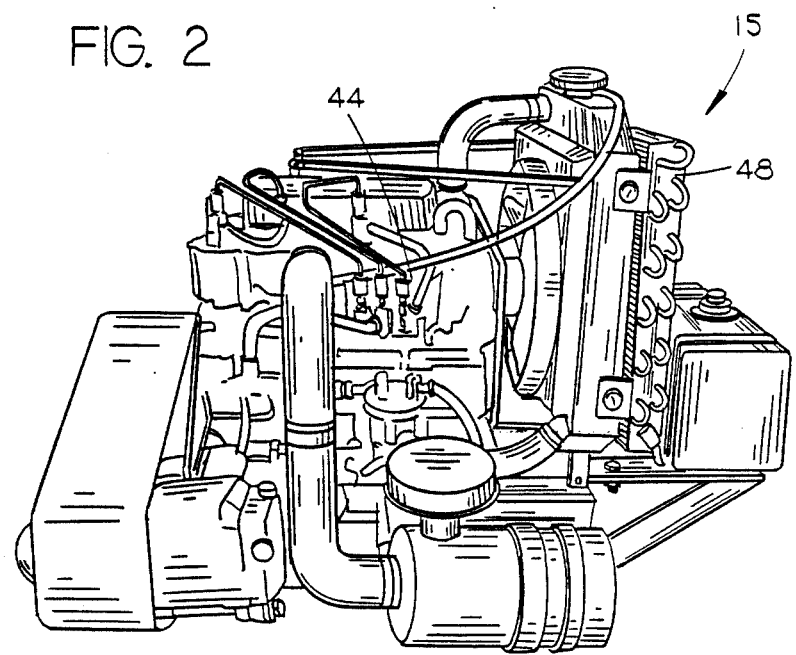
FIG. 3 is a rear view of the apparatus of this invention.
Figure 4:
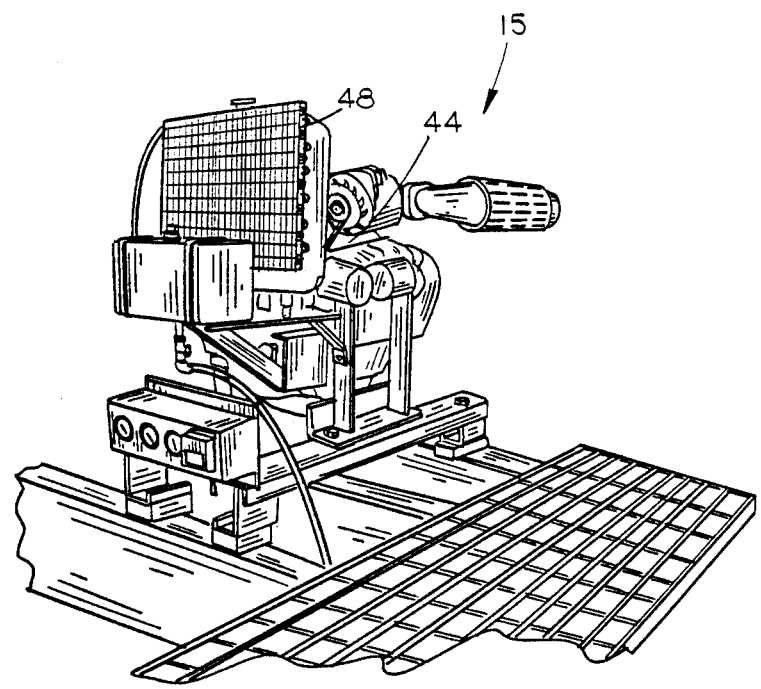
FIG. 4 is a rear perspective view of the apparatus of this invention.
Figure 5:
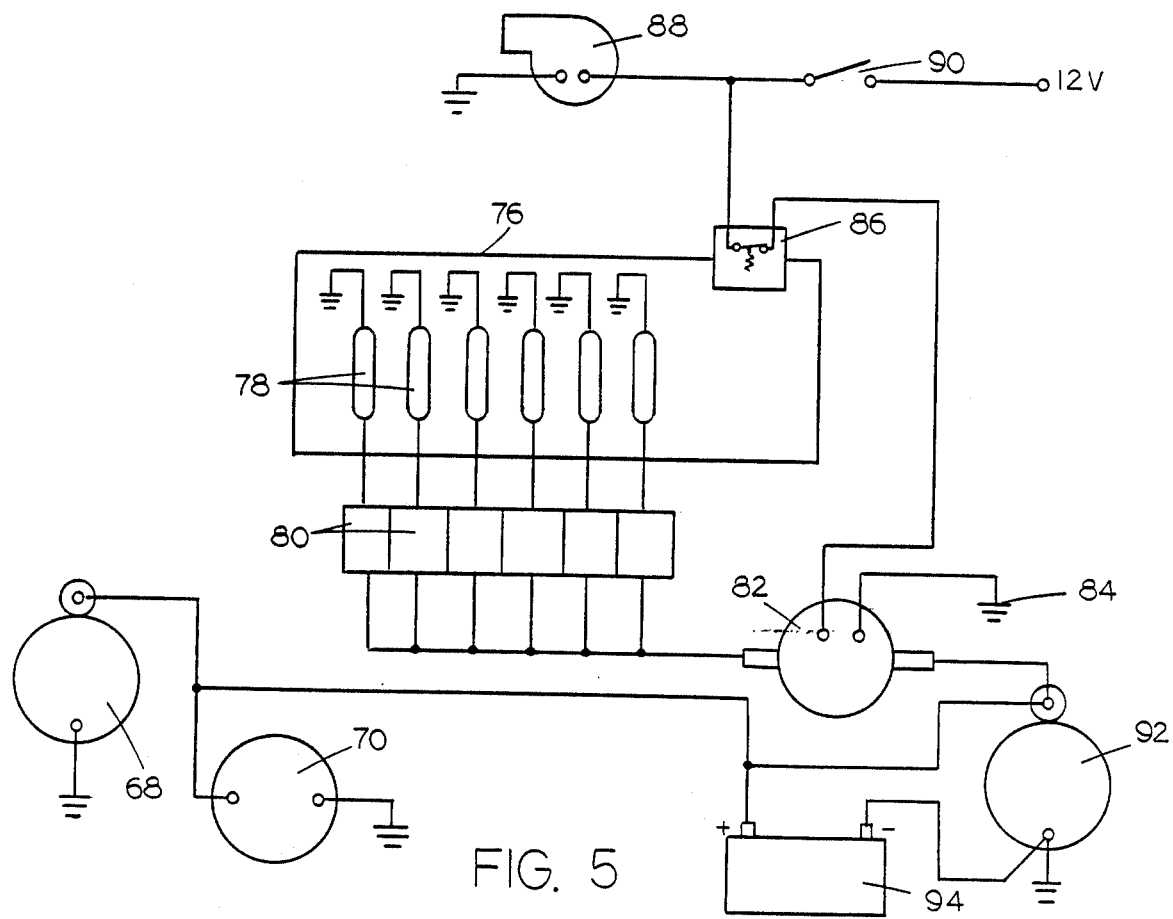
FIG. 5 is a schematic of the electrical circuit of the invention.

The numeral 10 refers to a conventional truck including a cab 12 mounted on a wheeled frame means 14. The truck illustrated in FIG. 1 does not include a sleeper cab while the truck shown in FIG. 2 does include a sleeper cab. The apparatus of this invention is designed to work with all types of trucks whether they have sleeper cabs or not and is generally referred to by the reference numeral 15. Truck 10 includes a diesel engine 16 (FIGS. 6 and 7) which is cooled by means of coolant passing through the radiator and water jackets of the engine in conventional fashion. Truck 10 includes a conventional heating system for heating the interior of the cab and the heating system includes a heater core 18 (FIG. 7) having inlet and outlet hoses 20 and 22 in communication therewith. The truck heating system also includes some sort of fan means for passing air over the heater core 18 and into the interior of the cab 12.

Truck 10 also includes an air-conditioning system comprising a compressor 24, condensor 26, dryer 28, expansion valve 30 and evaporator 32. The air-conditioning system for the truck would also include a fan means for directing air over the evaporator 32 for supplying cool air to the interior of the cab 12.

For purposes of description, the numeral 34 refers to the hose or pipe connecting compressor 24 and condensor 26 while the numeral 36 refers to the hose or pipe which connects condensor 26 and dryer 28. As seen in the drawings, hose 38 connects dryer 28 with expansion valve 30 and hose or pipe 40 connects expansion valve 30 with evaporator 32. Hose 42 connects evaporator 32 with compressor 24 at 65.

Figure 6:
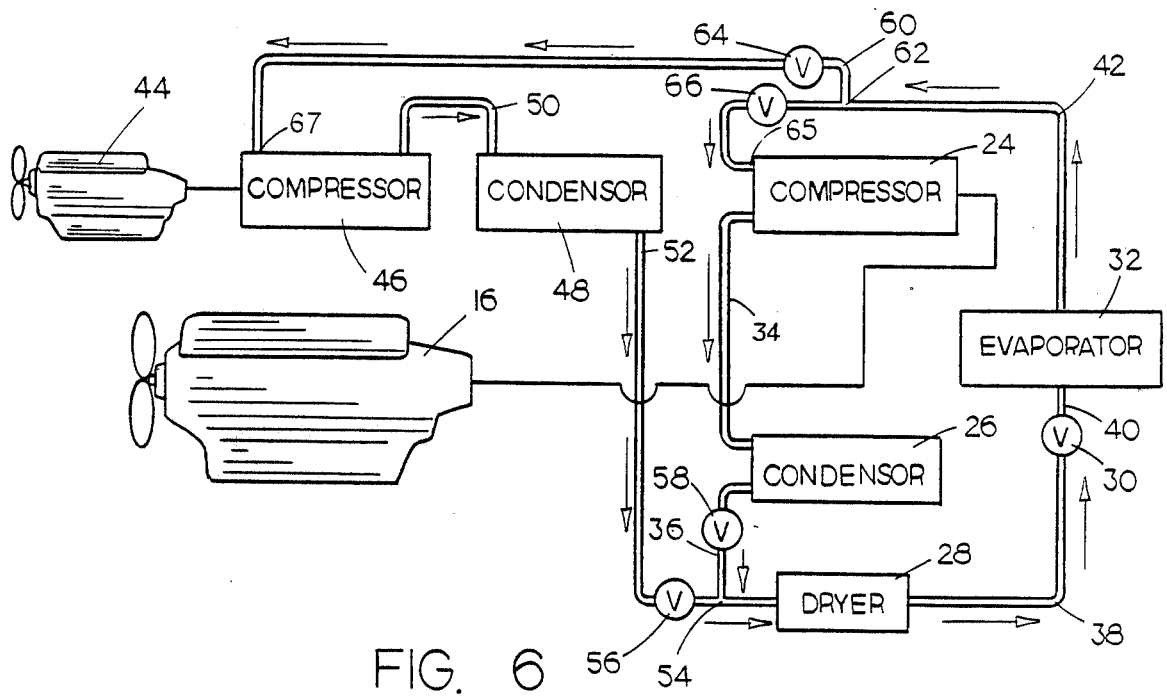
FIG. 6 is a schematic of the air-conditioning portion of the invention.

The numeral 44 refers to an auxiliary engine of the diesel type which is preferably mounted on the frame rails rearwardly of the truck cab 12 or on the side of the frame rails through the use of a set of mounting brackets. Auxiliary engine 44 has an air-conditioner compressor 46 mounted thereon which is driven by the engine 44 and which is connected to a condensor 48 by means of hose 50. Condensor 48 has a hose 52 extending therefrom which is connected to hose 36 at 54. An electrically operated valve 56 is imposed in line 52 as seen in FIG. 6. An electrically operated valve 58 is positioned in hose 36 between condensor 26 and connection 54. Hose 60 is connected to hose 42 at 62 and has an electrically actuated valve 64 imposed therein as seen in the drawings. Hose 42 has an electrically actuated valve 66 imposed therein between compressor 24 and connection 62. Hose 60 is connected to the intake or low pressure side of compressor 46 at 67.

Figure 7:
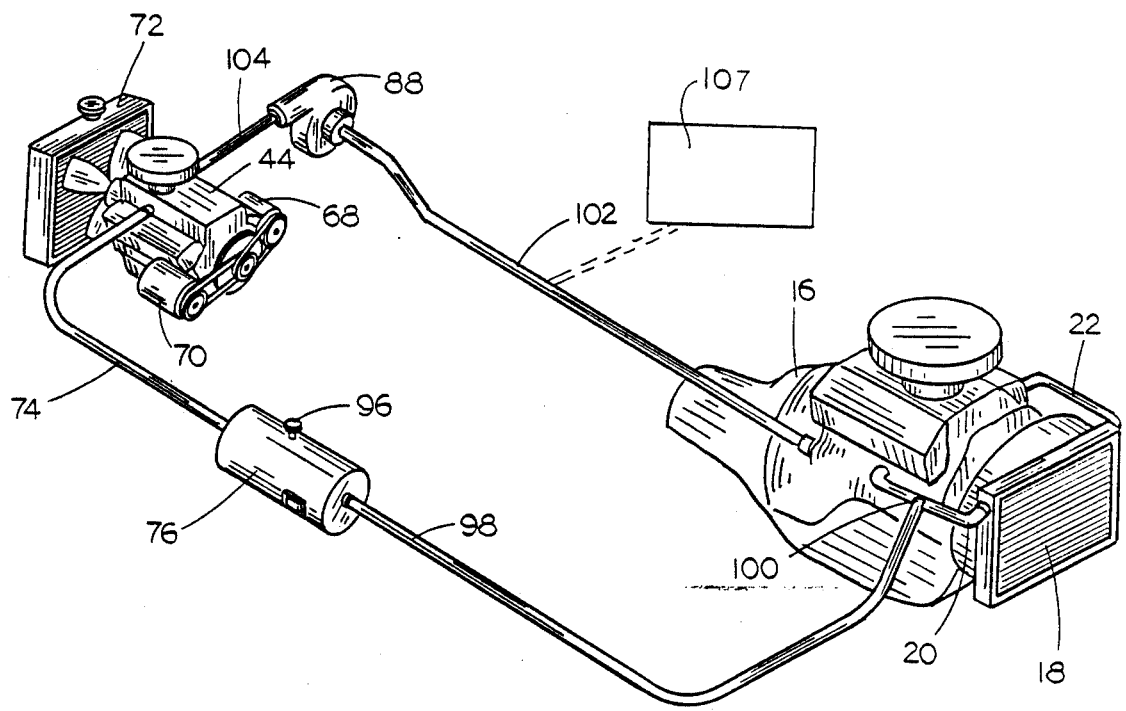
FIG. 7 is a perspective view illustrating the heating portion of the invention.

As shown in FIG. 7, engine 44 also includes starter 68 and an alternator 70. The drawings illustrate engine 44 as including a radiator 72 but radiator 72 can be omitted if desired. Hose 74 extends from engine 44 and is in fluid communication with the water manifold or water jackets of the engine. Hose 74 is connected to a tank heater 76 having a plurality of 12-volt heating elements 78 positioned therein, each of which are connected to a circuit breaker 80. Circuit breakers 80 are connected to a magnetic switch 82 which is grounded at 84 and which is electrically connected to temperature switch 86. Switch 86 is connected to a 12-volt coolant pump 88 and switch 90. Switch 90 is located in the truck cab for convenience of the driver. The truck engine starter 92 is connected to the truck battery 94 as illustrated in the drawings.

Tank heater 76 includes a purging vent 96 and has hose 98 extending therefrom which is connected to inlet hose 20 at 100. Hose 102 is operatively connected to the water manifold or water jackets at the rear of the truck engine 16 and extends to the 12-volt water pump 88 which pumps water to the engine 44 through hose 104.

When it is desired to air-condition the cab of the vehicle without operating the primary engine 16, auxiliary engine 44 is actuated so that compressor 46 is driven. Compressor 46 supplies the refrigerant to condensor 48 which delivers the refrigerant to the dryer 28 by means of line 52, valve 56 and line 54. The refrigerant passes from dryer 28 and is supplied to the evaporator 32 through the line 38, expansion valve 30 and line 40. The truck air-conditioner fan is then actuated so that air is passed over the evaporator 32 to supply cool air to the interior of the cab. After the refrigerant has passed through the evaporator 32, it is returned to the compressor 46 through line 42, line 60 and valve 64. Although the circuitry for actuating the various valves has not been shown, such circuitry would be provided for simultaneously opening valves 56 and 64 while simultaneously closing valves 58 and 66. Conversely, the electrical circuitry would also open valves 58 and 66 while simultaneously closely valves 56 and 64.

When the compressor 46 is being operated, cool air is delivered to the interior of the truck cab without the necessity of operating the engine 16. When the engine 16 is being operated, the auxiliary engine 44 would be deactuated and the valves 56 and 64 closed with the valves 58 and 66 being opened so that the refrigerant from the compressor 24 can circulate through the air-conditioning system of the truck in conventional fashion.

When it is desired to heat the interior of the truck cab without running the primary engine 16, engine 44 is actuated. The hot coolant in the engine 44 is pumped to the tank heater 76 wherein the water is further heated by the heating element 78 contained therein. The hot water passes from the tank heater 76 to the inlet of the heater core 18. As the hot water passes through the heater core 18 of the truck heating system, air is passed over the heater core to deliver warm air to the interior of the cab. The water is returned to the engine 44 through the hose 102 and the pump 88. The hot coolant water from the auxiliary engine may also be used to heat the diesel fuel in the fuel tank 107, is desired. When the truck engine 16 is being operated, the engine 44 is not operated with the truck engine 16 heating the interior of the cab in conventional fashion.

Thus it can be seen that a novel means has been provided for heating and cooling the interior of a truck cab through the use of an auxiliary engine. The auxiliary engine not only can heat/cool the interior of the truck cab without the requirement that the engine 16 be operated, it can also be operated to deliver electrical power to the truck electrical system so that the truck battery and electrically operated diesel fuel tank heater, etc. can be operated.

It can therefore be seen that a novel means has been provided which permits the heating and cooling of a truck cab without extensive modification of the truck heating and cooling system through the utilization of the majority of the components of the truck heating and cooling system. Although the invention is described as being ideally suited for use with trucks, the invention may also be used on RV's as well. It can therefore be seen that the invention accomplishes at least all of its stated objectives.

I claim:

1. In combination,
a truck including a cab, a water-cooled primary engine, an air-conditioning system including a first compressor driven by said engine, an evaporator and a condensor, and a heating system operatively connected to the coolant of the engine,
an auxiliary engine mounted on said truck and including a second air-conditioner compressor driven thereby, a second condensor operatively connected to said second compressor,
an alternator mounted on and driven by said auxiliary engine, said alternator being selectively operatively connected to the truck electrical system to selectively supply electrically thereto when said primary engine is not running.
means operatively connecting the downstream side of said second condensor to the inlet of said evaporator,
means connecting the outlet of said evaporator to the inlet of said second air-conditioner compressor,
and control means for selectively supplying refrigerant from either said second compressor or said first compressor to said evaporator whereby the interior of said cab may be cooled without operating the engine of said truck.

2. The combination of claim 1 wherein said auxiliary engine is water cooled and wherein means fluidly connects the coolant in said auxiliary engine to said heating system whereby the hot coolant water in said auxiliary engine may be supplied to said heating system to provide heat to the interior of said cab without operating the truck engine.

3. The combination of claim 2 wherein means is provided for further heating the coolant water in said auxiliary engine.

4. The combination of claim 2 wherein the hot coolant water from the auxiliary engine also heats the fuel in the truck fuel tank.

5. A truck including a cab, comprising, a water-cooled primary engine including a radiator for cooling fluid moving through the water jackets of the engine, a heating system for heating the interior of the cab including a heater core operatively connected to the hot fluid moving through the water jackets, and an electrically operated fan for moving air through said heater core and into the cab.

an auxiliary water-cooled engine mounted on said truck, an alternatior mounted on and driven by said auxiliary engine, said alternator being operatively connected to the truck electrical system to supply electricity thereto when said primary engine is not running, means fluidly connecting the coolant water of said auxiliary engine to said heater core to selectively supply hot coolant water from said auxiliary engine to said heater core when said primary engine is not running, whereby said auxiliary engine will provide heat to the interior of said cab without operating said primary engine.

6. The apparatus of claim 5 wherein means is provided for further heating the coolant water in said auxiliary engine.

* * * * *

Notice of Adverse Decision in Interference

In Interference No. 102,438, involving Patent No. 4,732,229, J. P. Lucht, MEANS FOR HEATING AND COOLING A TRUCK CAB, final judgement adverse to the patetee was rendered Nov. 29, 1990, as to claims 1-6.

*(Official Gazette March 5, 1991)*